United States Patent Office 2,759,980
Patented Aug. 21, 1956

2,759,980

PROCESS FOR THE PREPARATION OF MONO-TERTIARY BUTYL-p-HYDROXY ANISOLE

George F. Rodgers, Kingsport, Tenn., assignor to Eastman Kodak Company, Rochester, N. Y., a corporation of New Jersey No Drawing. Application March 12, 1952,
Serial No. 276,220

1 Claim. (Cl. 260—613)

This invention relates to the preparation of monotertiary butyl-4-methoxyphenol by reacting 2,5-ditertiary butyl 4-methoxyphenol with 4-methoxyphenol in the presence of a boron trifluoride catalyst and an aromatic hydrocarbon solvent at temperatures of from about $-10°$ to about $110°$ C.

Monotertiary butyl 4-methoxyphenol is a valuable anti-oxidant for edible products. It can be etherified to form diethers of monotertiary butylhydroquinone which possess strong and characteristic aromas, such as to render them of value in the preparation and blending of perfumes and commercial odorants. Of special interest has been the dimethyl ether of monotertiary butyl hydroquinone which has an odor characterized as a powerful aroma of an earthy, musty character similar to that of raw potatoes and which compound has a low evaporation rate and a correspondingly high life expectancy as an odorant. Moreover, these diethers have good compatibility with other compounds employed in the preparation of odorants.

As regards the prior art relating to the preparation of monotertiary butyl-4-methoxyphenol, there is no description of the process of this invention although processes are disclosed whereby dialkylated phenols may be employed to alkylate phenols whereby the dialkylated phenols are partially dealkylated to form monoalkylated derivatives. Thus, diamyl phenol can be reacted with phenol at $170°$ C. in the presence of sulfuric acid to form monoamyl phenol. The prior art does not disclose that solvents such as benzene can be advantageously employed in this type of reaction, although it is known that polyhydric phenols can be alkylated with olefins in solution in benzene. The prior art does not suggest that boron trifluoride or any derivatives thereof can be advantageously employed as a catalyst in processes such as that of this invention.

I have discovered an improved process for partially dealkylating ethers of polyalkylated polyhydric phenols at a relatively low temperature in the presence of an aromatic hydrocarbon solvent employing as the catalyst boron trifluoride or certain of its derivatives.

It is an object of my invention to provide an improved process for converting dialkylated ethers of hydroquinone into the corresponding monoalkylated ethers of hydroquinone. It is a further object to provide an especially effective catalyst for employment in such a process. More particularly, an object of my invention is the conversion by such a process of 2,5-ditertiary butyl-4-methoxyphenol into a mixture of 2-tertiary butyl-4-methoxyphenol and 3-tertiary butyl-4-methoxyphenol. Additional objects will become apparent hereinafter.

According to my invention a process is provided for preparing a mixture of 2- and 3-isomers of tertiary butyl-4-methoxy phenol, hereinafter referred to as mixed isomers thereof, which comprises reacting 2,5-ditertiary butyl-4-methoxyphenol with 4-methoxy phenol in the presence of boron trifluoride or certain of its derivatives in solution in an aromatic hydrocarbon of the benzene series at a temperature of from about $-10°$ C. to about $120°$ C.

Acidic catalysts which can also be employed but which are not included within the scope of my invention include sulfuric acid, phosphoric acid, various related acids, salts, etc. Boron trifluoride is the catalyst advantageously employed according to my invention; however, certain addition complexes of boron trifluoride with alcohols, acids, ethers, etc. can also be employed.

In general, more of the catalyst is required for a longer time at the lower end of the range of $-10°$ to $120°$ C. If shorter reaction periods are desired, the temperature can be raised and/or the amount of catalyst can be increased. Advantageously, from about 0.5 percent to about 10 percent of the catalyst can be employed; however, higher and lower amounts can also be employed. Generally it is quite advantageous to employ the catalyst in a range of proportions of from about 1 to about 5 percent. These percentages are based upon the total weight of the reactants being employed excluding the solvent.

It is advantageous to employ one mol proportion of 2,5-ditertiary butyl-4-methoxyphenol for each mol proportion of 4-methoxyphenol being reacted. This represents a weight ratio of about 1.9 of the former to about 1 of the latter compound. This ratio can be varied somewhat but it is advantageous to keep it close to the theoretical ratio of one mol of the former to one mol of the latter.

The aromatic hydrocarbon solvents which can be employed are those of the benzene series. These solvents advantageously contain from 6 to 9 carbon atoms. Examples of these solvents include benzene, toluene and xylene. Since the reactants and the products are almost completely miscible with benzene or other similar aromatic hydrocarbon solvents at the reaction temperatures employed, it is evident that wide ranges of proportions of such solvents can be advantageously employed. The solvent is quite necessary to the advantageous accomplishment of the reaction as can be exemplified by the fact that an unsuccessful experiment was conducted without using a solvent. The lower limit of solvent would seem to be that at which the reactants and reaction products are immiscible. By the employment as a solvent of an aromatic hydrocarbon of the benzene series containing from 6 to 9 carbon atoms, moderate temperatures can be advantageously employed resulting in good yields of 2-tertiary butyl-4-methoxyphenol. The proportion of solvent employed can advantageously be from about an amount equal to the total weight of the mixture of reactants, viz., 2-5-ditertiary butyl-4-methoxyphenol and 4-methoxyphenol, to about twice that quantity by weight. Larger and smaller proportions can also be employed.

Temperatures which can be advantageously employed can be varied from about $-10°$ to about $110°$ C. Most advantageously the temperature employed can be from about $15°$ to about $50°$ C. Room temperature can be very advantageously employed since no heating is then required. Temperatures in the upper part of the range given result in more rapid reaction. As pointed out above, more catalyst is generally required over a longer period of time at the lower temperatures. However, one of the advantages of my invention resides in the fact that small quantities of the catalyst can be employed at relatively low temperatures to obtain relatively high yields of the desired products.

The following example will serve to further illustrate my invention:

*Example 1.—BF₃ as catalyst*

118 grams of 2,5-ditertiary butyl-4-methoxyphenol and 62 grams of 4-methoxyphenol were dissolved in 200 cc. of benzene and 4.0 grams of boron trifluoride was introduced at 25° C. The mixture was stirred for three hours and then allowed to stand at room temperature, following which the mixture was water-washed and the benzene was removed by distillation. Finally, the residual material was distilled at reduced pressure. The distilled product weighed 168.7 grams and upon analysis was found to contain the following:

17.8% 2,5-ditertiary butyl-4-methoxyphenol
21.3% hydroquinone monomethyl ether
44.8% 3-tertiary butyl-4-methoxyphenol
16.1% 2-tertiary butyl-4-methoxyphenol Higher temperatures and continued stirring for extended periods of time can be employed to effect more rapid reaction or the mixture can be allowed to stand at room temperature for extended periods of time, e. g., 65 hours as in Example 1, whereby continued stirring at elevated temperatures is unnecessary to obtain good yields. Larger quantities of boron trifluoride can be employed to obtain more rapid reaction. Addition complexes of boron trifluoride with alcohols, ethers, acids, etc., can be employed in place of boron trifluoride per se.

The following examples illustrate for comparison the employment of sulfuric acid as the catalyst:

*Example 2.—2% of $H_2SO_4$ as catalyst at 40° C.*

59 grams of 2,5-ditertiary butyl-4-methoxyphenol, 31 grams of 4-methoxyphenol, 200 cc. of benzene and 1 cc. (about 2% by weight) of 104% $H_2SO_4$ were mixed and stirred at 40° C. for four hours. After water-washing the solvent was removed and the product was distilled at reduced pressure. The distilled product had the following analysis:

66.8% 2,5-ditertiary butyl-4-methoxyphenol
28.5% 4-methoxyphenol
4.5% 3-tertiary butyl-4-methoxyphenol
0.2% 2-tertiary butyl-4-methoxyphenol By increasing the temperature without increasing the quantity of sulfuric acid catalyst, the following results can be obtained:

*Example 3.—2% of $H_2SO_4$ as catalyst at 60° C.*

The quantities of materials in the procedure in Example 2 were repeated exactly except that the temperature employed was 60° C. The distilled product obtained had the following analysis:

41.0% 2,5-ditertiary butyl-4-methoxyphenol
32.0% 4-methoxyphenol
22.2% 3-tertiary butyl-4-methoxyphenol
4.7% 2-tertiary butyl-4-methoxyphenol The preceding example illustrates the effectiveness of increasing the temperature insofar as increasing the yield obtained is concerned. The yield can be similarly increased by increasing the amount of catalyst even when the temperature employed is reduced somewhat. This is illustrated by the following example:

*Example 4.—31% of $H_2SO_4$ as catalyst at 30° C.*

Materials employed in Examples 2 and 3 were mixed in the same proportions and the same procedure employed except that the temperature was 30° C. and the amount of catalyst was 15 cc. (27.8 grams) which is about 31% based on the weight of the reactants employed. The distilled product obtained had the following analysis:

26.7% 2,5-ditertiary butyl-4-methoxyphenol
18.3% hydroquinone monomethyl ether
41.7% 3-tertiary butyl-4-methoxyphenol
13.3% 2-tertiary butyl-4-methoxyphenol Even though good yields are obtained when sulfuric acid in high concentration is employed as the catalyst, better yields can be obtained when boron trifluoride is employed at lower temperatures; see Example 1. It is evident that boron trifluoride is an excellent catalyst which can be employed at lower temperatures and in lower concentrations to effect improved results as compared to the employment of sulfuric acid. Another advantage obtained by the use of boron trifluoride as the catalyst as in Example 1 can be illustrated by considering the fact that one of the isomers of the product obtained, viz., 2-tertiary butyl-4-methoxyphenol, is the most potent isomer as a food antioxidant. The use of boron trifluoride in Example 1 results in a ratio of this isomer to the much less potent isomer of about 0.36 whereas the ratio of isomers when sulfuric acid is employed is less than 0.05 in Example 2, is about 0.21 in Example 3, and only approaches the more desirable ratio of Example 1 when the very high proportion of catalyst of Example 3 is employed, thereby resulting in a ratio of 0.32.

What I claim as my invention and desire to secure by Letters Patent of the United States is:

A process for preparing a mixture of about 0.36 proportion by weight of 2-tert. butyl-4-methoxyphenol for each proportion by weight of 3-tert. butyl-4-methoxyphenol which comprises reacting 1 mole of 2,5-ditert. butyl-4-methoxy-phenol with 1 mole of 4-methoxyphenol dissolved in benzene at room temperature in the presence of from 1 to 5% by weight of the reactants of boron trifluoride.

References Cited in the file of this patent

UNITED STATES PATENTS

| | | |
|---|---|---|
| 2,189,805 | Kyrides | Feb. 13, 1940 |
| 2,553,538 | Arnold | May 22, 1951 |
| 2,560,666 | Stevens et al. | July 17, 1951 |
| 2,676,191 | Hoatson et al. | Apr. 20, 1954 |

OTHER REFERENCES

Niederl: Industrial & Engineering Chem., vol. 30, No. 11, p. 1270 (November 1938).